(12) United States Patent
Kelly et al.

(10) Patent No.: US 11,347,286 B2
(45) Date of Patent: May 31, 2022

(54) SYSTEMS AND METHODS FOR PRE-CONDITIONING SYSTEM TEMPERATURE USING LIQUID

(71) Applicant: Dell Products L.P., Round Rock, TX (US)

(72) Inventors: Adam Kelly, Georgetown, TX (US); Ayedin Nikazm, Austin, TX (US); Robert B. Curtis, Georgetown, TX (US); James Utz, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 17 days.

(21) Appl. No.: 16/732,624

(22) Filed: Jan. 2, 2020

(65) Prior Publication Data

US 2021/0208645 A1 Jul. 8, 2021

(51) Int. Cl.
*G06F 1/20* (2006.01)
*G05B 19/4155* (2006.01)

(52) U.S. Cl.
CPC ......... *G06F 1/206* (2013.01); *G05B 19/4155* (2013.01); *G05B 2219/49216* (2013.01); *G06F 2200/201* (2013.01)

(58) Field of Classification Search
CPC ...................................................... G06F 1/206
USPC ......................................................... 700/300
See application file for complete search history.

(56) References Cited

U.S. PATENT DOCUMENTS

| 2008/0296397 | A1* | 12/2008 | Cheng | G06F 1/18 237/2 R |
| 2009/0021908 | A1* | 1/2009 | Patel | G06F 1/20 361/688 |
| 2009/0234705 | A1* | 9/2009 | Brunschwiler | H05K 7/20836 62/259.2 |
| 2014/0301031 | A1* | 10/2014 | Louvar | H05K 7/20254 361/679.31 |
| 2016/0162297 | A1* | 6/2016 | Shao | G06F 9/4401 713/2 |
| 2018/0004259 | A1* | 1/2018 | Kulkarni | F25B 21/02 |
| 2018/0283741 | A1* | 10/2018 | Bei | F16F 15/022 |

* cited by examiner

*Primary Examiner* — Suresh Suryawanshi
(74) *Attorney, Agent, or Firm* — Jackson Walker L.L.P.

(57) ABSTRACT

A method for providing thermal control of an information handling system may include in response to a request to power on the information handling system, in order to pre-condition a temperature associated with the information handling system to within a desired temperature range, receiving an indication of a temperature associated with the information handling system and based on the indication of the temperature associated with the information handling system, control the one or more temperature control elements for regulating a liquid of a liquid thermal control system to cause the temperature associated with the information handling system to fall within the desired temperature range prior to full powering on of the information handling system.

9 Claims, 2 Drawing Sheets

SYSTEMS AND METHODS FOR PRE-CONDITIONING SYSTEM TEMPERATURE USING LIQUID

TECHNICAL FIELD

The present disclosure relates in general to information handling systems, and more particularly to pre-conditioning a system temperature in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, air movers (e.g., cooling fans and blowers) have often been used in information handling systems to cool information handling systems and their components.

To control temperature of components of an information handling system, an air mover may direct air over one or more heatsinks thermally coupled to individual components. Traditional approaches to cooling components may include a "passive" cooling system that serves to reject heat of a component to air driven by one or more system-level air movers (e.g., fans) for cooling multiple components of an information handling system in addition to the peripheral component. Another traditional approach may include an "active" cooling system that uses liquid cooling, in which a heat-exchanging cold plate is thermally coupled to the component, and a chilled fluid is passed through conduits internal to the cold plate to remove heat from the component.

Furthermore, increasingly, information handling systems are used in locations in which temperatures may be at levels below or above a range of temperatures supported by an individual component. For example, in extremely low temperature conditions, an information handling system may have temperatures below an acceptable operating temperature prior to operation, or in extremely high temperature conditions, an information handling system may be above an acceptable operating temperature prior to operation. In addition, it may be desirable that an information handling system maintain safe storage temperatures while not operating, but in standby mode.

SUMMARY

In accordance with the teachings of the present disclosure, the disadvantages and problems associated with thermal control of an information handling system may be substantially reduced or eliminated.

In accordance with embodiments of the present disclosure, an information handling system may include an information handling resource and a liquid thermal control system for providing thermal control of the information handling system. The liquid thermal control system may include a fluidic subsystem configured to convey a liquid proximate to the information handling resource in order to transfer heat from the information handling resource to the fluid or from the fluid to the information handling resource, one or more temperature control elements configured to regulate temperature of the liquid, and a control subsystem configured to, in response to a request to power on the information handling system, in order to pre-condition a temperature associated with the information handling system to within a desired temperature range, receive an indication of the temperature associated with the information handling system and based on the indication of the temperature associated with the information handling system, control the one or more temperature control elements to cause the temperature associated with the information handling system to fall within the desired temperature range prior to full powering on of the information handling system.

In accordance with these and other embodiments of the present disclosure, a liquid thermal control system may include a fluidic subsystem configured to convey a liquid proximate to the information handling resource in order to transfer heat from the information handling resource to the fluid or from the fluid to the information handling resource, one or more temperature control elements configured to regulate temperature of the liquid, and a control subsystem configured to, in response to a request to power on the information handling system, in order to pre-condition a temperature associated with the information handling system to within a desired temperature range, receive an indication of the temperature associated with the information handling system and based on the indication of the temperature associated with the information handling system, control the one or more temperature control elements to cause the temperature associated with the information handling system to fall within the desired temperature range prior to full powering on of the information handling system.

In accordance with these and other embodiments of the present disclosure, a method for providing thermal control of an information handling system may include in response to a request to power on the information handling system, in order to pre-condition a temperature associated with the information handling system to within a desired temperature range, receiving an indication of a temperature associated with the information handling system and based on the indication of the temperature associated with the information handling system, control the one or more temperature control elements for regulating a liquid of a liquid thermal control system to cause the temperature associated with the information handling system to fall within the desired temperature range prior to full powering on of the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
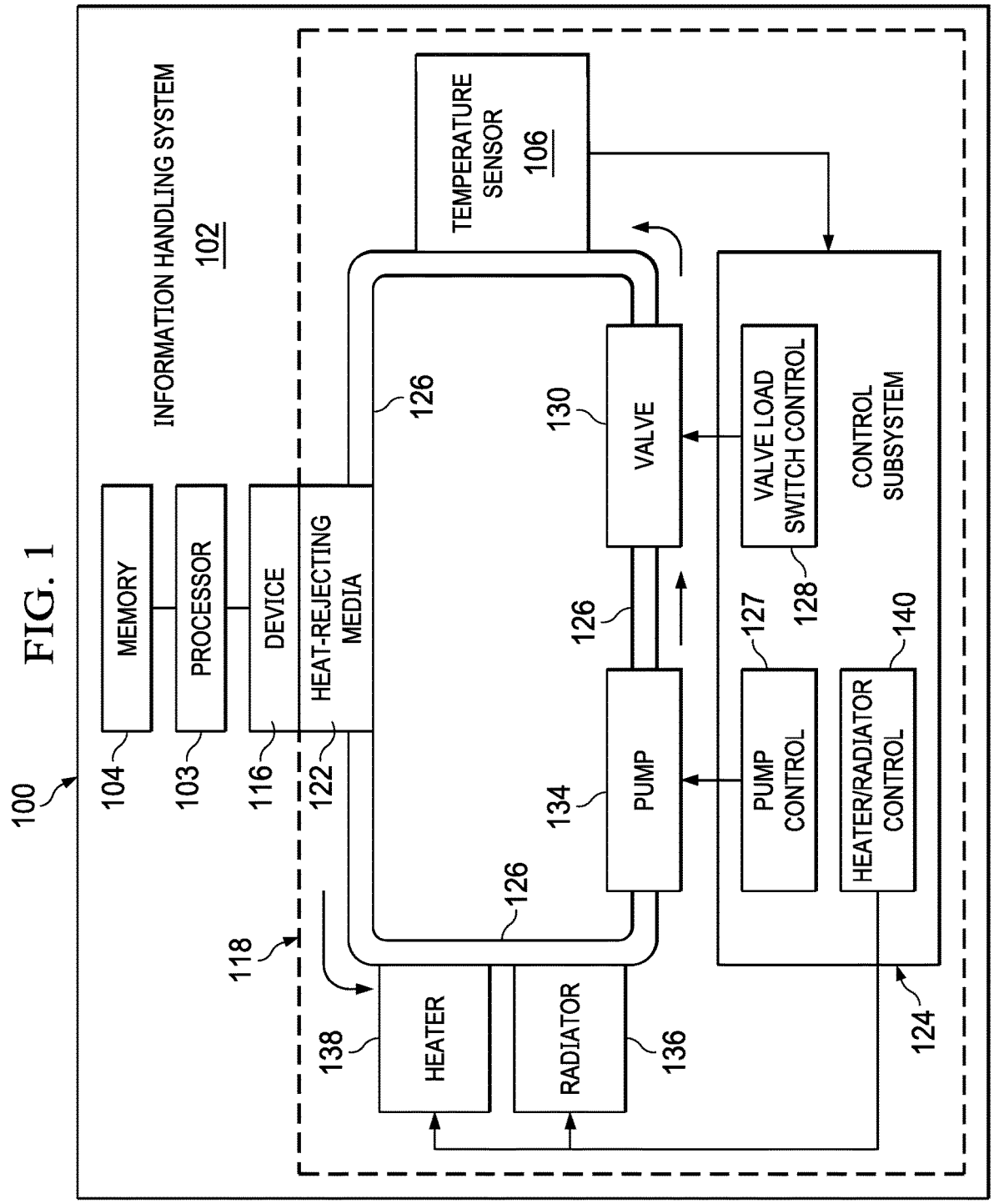
FIG. 1 illustrates a block diagram of an example information handling system, in accordance with embodiments of the present disclosure.
Figure 2:
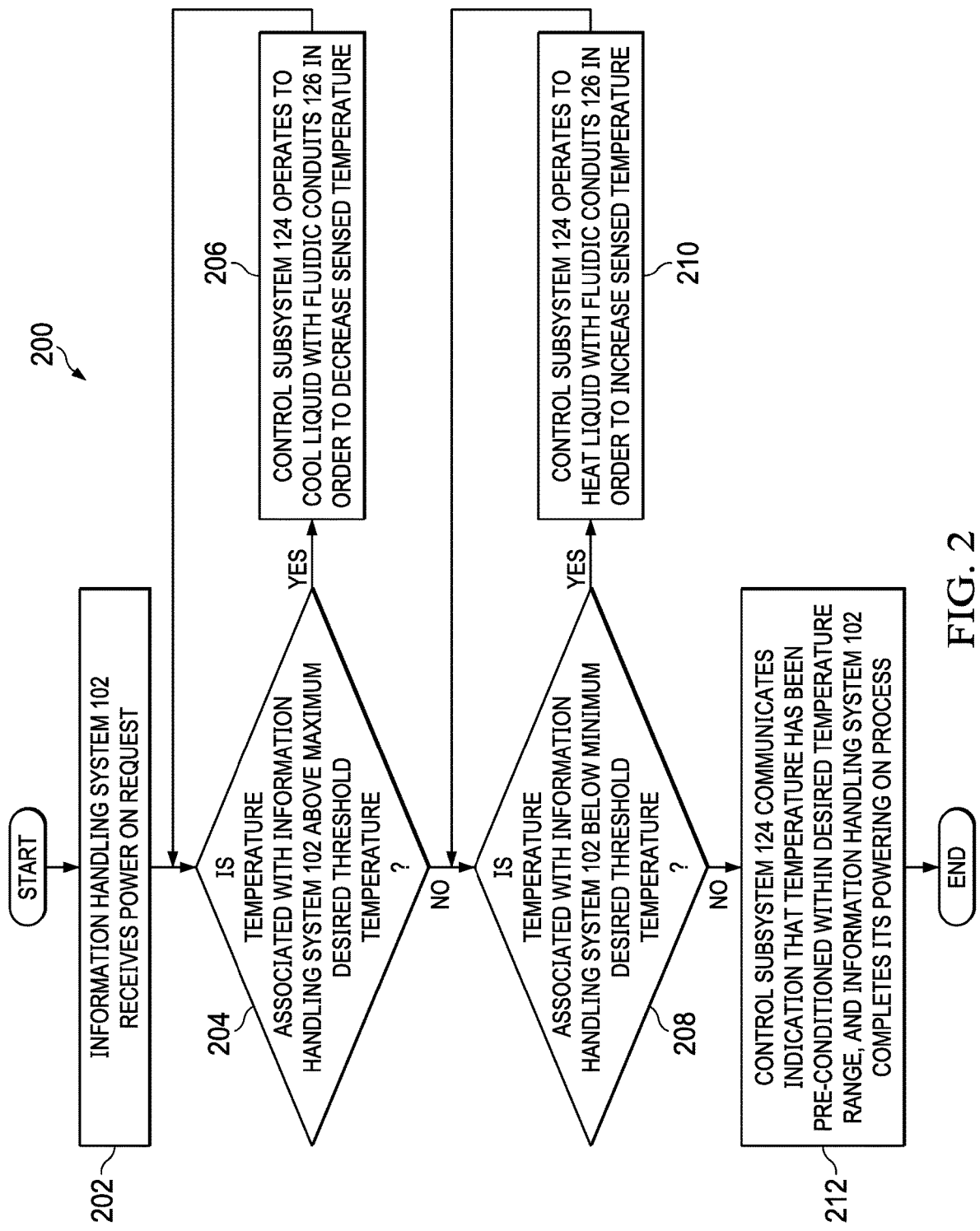
FIG. 2 illustrates a flow chart of an example method for pre-conditioning a temperature of an information handling system, in accordance with embodiments of the present disclosure.

Preferred embodiments and their advantages are best understood by reference to FIGS. 1 and 2, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data. As shown in FIG. 1, information handling system 102 may include a chassis 100 housing a processor 103, a memory 104, a device 116, and a liquid thermal control system 118.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Device 116 may comprise any component information handling system of information handling system 102, including without limitation processors, buses, memories, I/O devices and/or interfaces, storage resources, network interfaces, motherboards, integrated circuit packages; electro-mechanical devices, displays, and power supplies.

As shown in FIG. 1, liquid thermal control system 118 may include a temperature sensor 106, a control subsystem 124, heat-rejecting media 122, pump 134, radiator 136, heater 138, valve 130, and fluidic conduits 126.

Temperature sensor 106 may be any system, device, or apparatus (e.g., a thermometer, thermistor, etc.) configured to communicate a signal to processor 103 or another controller indicative of a temperature within information handling system 102. In many embodiments, information handling system 102 may comprise a plurality of temperature sensors 106, wherein each temperature sensor 106 detects a temperature of a particular component and/or location within information handling system 102. Although FIG. 1 shows temperature sensor 106 in thermal communication with fluidic conduits 126 in order to determine a temperature of fluid therein, it is understood that temperature sensor 106 may appear in any suitable location within information handling system 102.

Control subsystem 124 may be communicatively coupled to temperature sensor 106, and may include any system, device, or apparatus (e.g., a processor, controller, etc.) configured to control components of liquid thermal control system 118 for increasing or decreasing a temperature of one or more information handling resources of information handling system 102. For example, control subsystem 124 may be configured to control pump 134, valve 130, radiator 136, and/or heater 138 based on thermal data sensed by temperature sensor 106, so as to maintain a safe operating temperature for one or more information handling resources. Accordingly, control subsystem 124 may include a pump control subsystem 127 for controlling operation of pump 134 (e.g., a pressure applied to coolant fluid in fluidic conduits 126 for moving such fluid through fluidic conduits 126), a valve load switch control subsystem 128 for controlling operation of valve 130 (e.g., opening or closing valve 130, controlling an aperture of valve 130, etc.), and a heater/radiator control subsystem 140 for controlling operation radiator 136 and/or heater 138 (e.g., enabling or disabling radiator 136, enabling or disabling heater 138, controlling a temperature of heater 138, etc.).

Pump 134 may be fluidically coupled to one or more fluidic conduits 126 and may comprise any mechanical or electro-mechanical system, apparatus, or device operable to produce a flow of fluid (e.g., fluid in one or more conduits 126). For example, pump 134 may produce fluid flow by applying a pressure to fluid in fluidic conduits 126. As described above, operation of pump 134 may be controlled by pump control subsystem 127 which may control electro-mechanical components of pump 134 in order to produce a desired rate of coolant flow.

Radiator 136 may include any device, system or apparatus configured to transfer thermal energy from one medium (e.g., fluid within a fluidic conduit 126) to another (e.g., air external to chassis 100) for the purpose of cooling and heating. In some embodiments, radiator 136 may include fluidic channels and/or conduits in at least a portion of radiator 136. Such fluidic channels and/or conduits may be fluidically coupled to one or more of fluidic conduits 126 and pump 134. As described above, operation of radiator 136 may be controlled by heater/radiator control subsystem 140 which may control components of radiator 136 in order to produce a desired rate of heat transfer from the liquid within fluidic conduits 126.

Heater 138 may include any device, system or apparatus configured to generate thermal energy and apply such generated thermal energy to liquid within fluidic conduits 126 in order to regulate a temperature of such liquid. As described above, operation of heater 138 may be controlled by heater/radiator control subsystem 140 which may control components of heater 138 in order to produce a desired temperature for the liquid within fluidic conduits 126.

Valve 130 may include any device, system or apparatus that regulates, directs, and/or controls the flow of a fluid (e.g., a coolant liquid in fluidic conduits 126) by opening, closing, or partially obstructing one or more passageways. When valve 130 is open, coolant liquid may flow in a direction from higher pressure to lower pressure. As described above, the operation of valve 130 (e.g., opening and closing, size of an aperture of valve 130) may be controlled by valve load switch control subsystem 128.

In operation, pump 134 may induce a flow of liquid (e.g., water, ethylene glycol, propylene glycol, or other coolant) through various fluidic conduits 126 of information handling system 102, valve 130 and/or radiator 136. As fluid passes by heat-rejecting media 122 in a fluidic conduit 126 proximate to device 116, heat may be transferred from device 116 to heat-rejecting media 122 and from heat-rejecting media 122 to the liquid in fluidic conduit 126. As such heated liquid flows by radiator 136, heat from the liquid may be transferred from the liquid to air ambient to chassis 100, thus cooling the liquid.

In other instances, as fluid passes by heat-rejecting media 122 in a fluidic conduit 126 proximate to device 116, heat may be transferred from the liquid in fluidic conduit 126 to heat-rejecting media 122 and from heat-rejecting media 122 to the device 116. As such cooled liquid flows by heater 138, heater 138 may increase the temperature of the liquid.

Heat-rejecting media 122 may include any system, device, or apparatus configured to transfer heat from an information handling resource (e.g., device 116, as shown in FIG. 1), thus reducing a temperature of the information handling resource. For example, heat-rejecting media 122 may include a solid thermally coupled to the information handling resource (e.g., heatpipe, heat spreader, heatsink, finstack, etc.) such that heat generated by the information handling resource is transferred from the information handling resource.

In addition to processor 103, memory 104, temperature sensor 106, device 116, and liquid thermal control system 118, information handling system 102 may include one or more other information handling resources. In addition, for the sake of clarity and exposition of the present disclosure, FIG. 1 depicts only one device 116. In embodiments of the present disclosure, information handling system 102 may include any number of devices 116. Furthermore, for the sake of clarity and exposition of the present disclosure, FIG. 1 depicts device 116 including a liquid thermal control system 118 for cooling of device 116. However, in some embodiments, approaches similar or identical to those used to cool device 116 as described herein may be employed to provide cooling of processor 103, memory 104, and/or any other information handling resource of information handling system 102.

As described in greater detail below, radiator 136 and heater 138 may in effect implement a bi-modal heat exchanger within information handling system 102 in order to pre-condition a temperature of information handling system 102. In other words, the bi-modal heat exchanger may use heater 138 to heat up liquid within fluidic conduits 126, and the bi-modal heat exchanger may use radiator 136 (or another cooling mechanism) to cool down liquid within fluidic conduits 126. In some embodiments, both of these pre-heating and pre-cooling subsystems may utilize an existing liquid cooling system of an information handling system. Control subsystem 124 may monitor a temperature associated with information handling system 102 via temperature sensor 106 and may regulate heating and cooling of the liquid as needed.

Furthermore, in a standby mode of operation of information handling system 102, liquid thermal control system 118 may maintain a stable temperature of the liquid so that information handling system 102 may be transitioned from the standby mode to an active mode with very little delay attributable to being outside of a safe operational thermal range.

FIG. 2 illustrates a flow chart of an example method 200 for pre-conditioning a temperature of information handling system 102, in accordance with embodiments of the present disclosure. According to certain embodiments, method 200 may begin at step 202. As noted above, teachings of the present disclosure may be implemented in a variety of configurations of information handling system 102 as shown in FIG. 1. As such, the preferred initialization point for method 200 and the order of the steps comprising method 200 may depend on the implementation chosen.

At step 202, information handling system 102 may receive a power on request (e.g., due to interaction with a power button of information handling system 102 or a remote management request to power on information handling system 102).

At step 204, control subsystem 124 may determine if a temperature associated with information handling system 102 and as sensed by temperature sensor 106 is above a maximum desired threshold temperature. If the sensed temperature is above the maximum desired threshold temperature, method 200 may proceed to step 206. Otherwise, method 200 may proceed to step 208.

At step 206, in response to the sensed temperature being above the maximum desired threshold temperature, control subsystem 124 may operate to attempt to reduce the sensed temperature by controlling valve 130, pump 134, and/or radiator 136 to cool the liquid with fluidic conduits 126. After completion of step 206, method 200 may proceed again to step 204.

At step 208, control subsystem 124 may determine if the temperature associated with information handling system 102 and as sensed by temperature sensor 106 is below a minimum desired threshold temperature. If the sensed temperature is below the minimum desired threshold temperature, method 200 may proceed to step 210. Otherwise, method 200 may proceed to step 212.

At step 210, in response to the sensed temperature being below the minimum desired threshold temperature, control subsystem 124 may operate to attempt to increase the sensed temperature by controlling valve 130, pump 134, and/or heater 138 to heat the liquid with fluidic conduits 126. After completion of step 210, method 200 may proceed again to step 208.

At step 212, in response to the sensed temperature being above the minimum desired threshold temperature and sensed temperature being below the maximum desired threshold temperature, control subsystem 124 may communicate an indication (e.g., to a basic input/output system, management controller, or other suitable controller) that temperature has been pre-conditioned within a desired temperature range, and information handling system 102 may complete its powering on process. After completion of step 212, method 200 may end.

Although FIG. 2 discloses a particular number of steps to be taken with respect to method 200, it may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof, or any other suitable system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   an information handling resource; and
   a liquid thermal control system for providing thermal control of the information handling system, and comprising:

a fluidic subsystem configured to convey a liquid proximate to the information handling resource in order to either heat the information handling resource, by transferring heat from the information handling resource to the liquid, or cool the information handling resource by transferring heat from the liquid to the information handling resource;

one or more temperature control elements configured to regulate temperature of the liquid; and a control subsystem configured to, in response to a request to power on the information handling system, in order to pre-condition a temperature associated with the information handling system to within a desired temperature range:

receive an indication of the temperature associated with the information handling system; and based on the indication of the temperature associated with the information handling system, control the one or more temperature control elements to cause the temperature associated with the information handling system to fall within the desired temperature range prior to full powering on of the information handling system; and cause the information handling system to complete full powering on of the information handling system responsive to the temperature associated with the information handling system falling within the desired temperature range;

wherein the one or more temperature control elements include a heating element and the control subsystem is configured to control the heating element to heat the liquid in response to the temperature associated with the information handling system being below the desired temperature range; and wherein the one or more temperature control elements include a cooling element and the control subsystem is configured to control the cooling element to cool the liquid in response to the temperature associated with the information handling system being above the desired temperature range.

2. The information handling system of claim 1, wherein the liquid comprises water.

3. A liquid thermal control system for providing thermal control of an information handling system, comprising:

a fluidic subsystem configured to convey a liquid proximate to an information handling resource of the information handling system in order to either heat the information handling resource, by transferring heat from the information handling resource to the liquid, or cool the information handling resource, by transferring heat from the liquid to the information handling resource;

one or more temperature control elements configured to regulate temperature of the liquid; and a control subsystem configured to, in response to a request to power on the information handling system, in order to pre-condition a temperature associated with the information handling system to within a desired temperature range:

receive an indication of the temperature associated with the information handling system; and based on the indication of the temperature associated with the information handling system, control the one or more temperature control elements to cause the temperature associated with the information handling system to fall within the desired temperature range prior to full powering on of the information handling system; and cause the information handling system to complete full powering on of the information handling system responsive to the temperature associated with the information handling system falling within the desired temperature range;

wherein the one or more temperature control elements include a heating element and the control subsystem is configured to control the heating element to heat the liquid in response to the temperature associated with the information handling system being below the desired temperature range;

wherein the one or more temperature control elements include a cooling element and the control subsystem is configured to control the cooling element to cool the liquid in response to the temperature associated with the information handling system being above the desired temperature range.

4. The liquid thermal control system of claim 3, wherein the liquid comprises water.

5. A method for providing thermal control of an information handling system, comprising:

in response to a request to power on the information handling system, in order to pre-condition a temperature associated with the information handling system to within a desired temperature range:

receiving an indication of a temperature associated with the information handling system; and based on the indication of the temperature associated with the information handling system, control the one or more temperature control elements for regulating a liquid of a liquid thermal control system to cause the temperature associated with the information handling system to fall within the desired temperature range prior to full powering on of the information handling system; and cause the information handling system to complete full powering on of the information handling system responsive to the temperature associated with the information handling system falling within the desired temperature range;

wherein the liquid thermal control system includes a fluidic subsystem configured to convey a liquid proximate to an information handling resource of the information handling system in order to either heat the information handling resource, by transferring heat from the information handling resource to the liquid, or cool the information handling resource, by transferring heat from the liquid to the information handling resource;

wherein the one or more temperature control elements include a heating element and the control subsystem is configured to control the heating element to heat the liquid in response to the temperature associated with the information handling system being below the desired temperature range wherein the one or more temperature control elements include a cooling element and the control subsystem is configured to control the cooling element to cool the liquid in response to the temperature associated with the information handling system being above the desired temperature range.

6. The method of claim 5, wherein the liquid comprises water.

7. The information handling system of claim 1, wherein the liquid is selected from the group including ethylene glycol and propylene glycol.

8. The liquid thermal control system of claim 3, wherein the liquid is selected from the group including ethylene glycol and propylene glycol.

9. The method of claim 6, wherein the liquid is selected from the group including ethylene glycol and propylene glycol.

\* \* \* \* \*